UNITED STATES PATENT OFFICE.

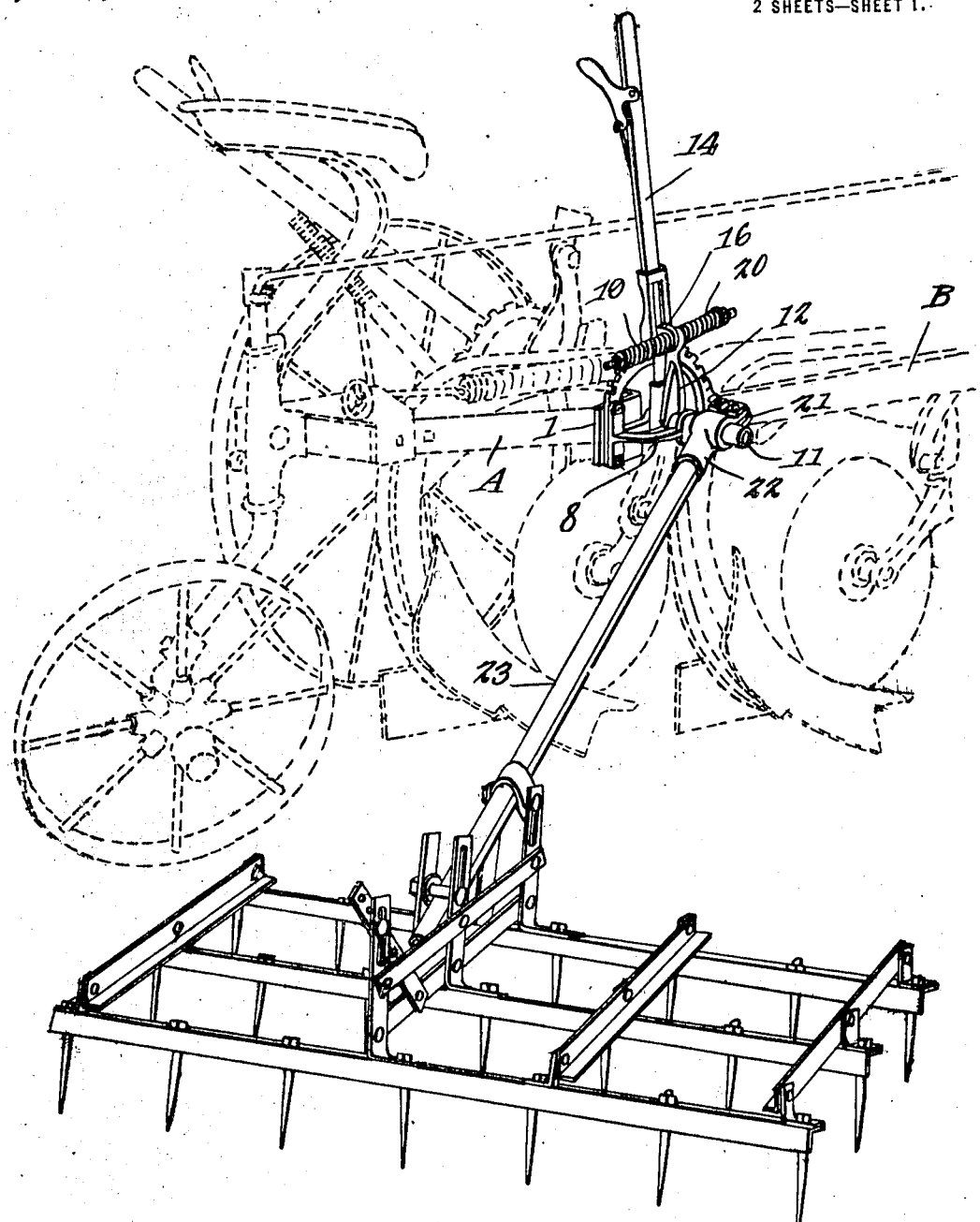

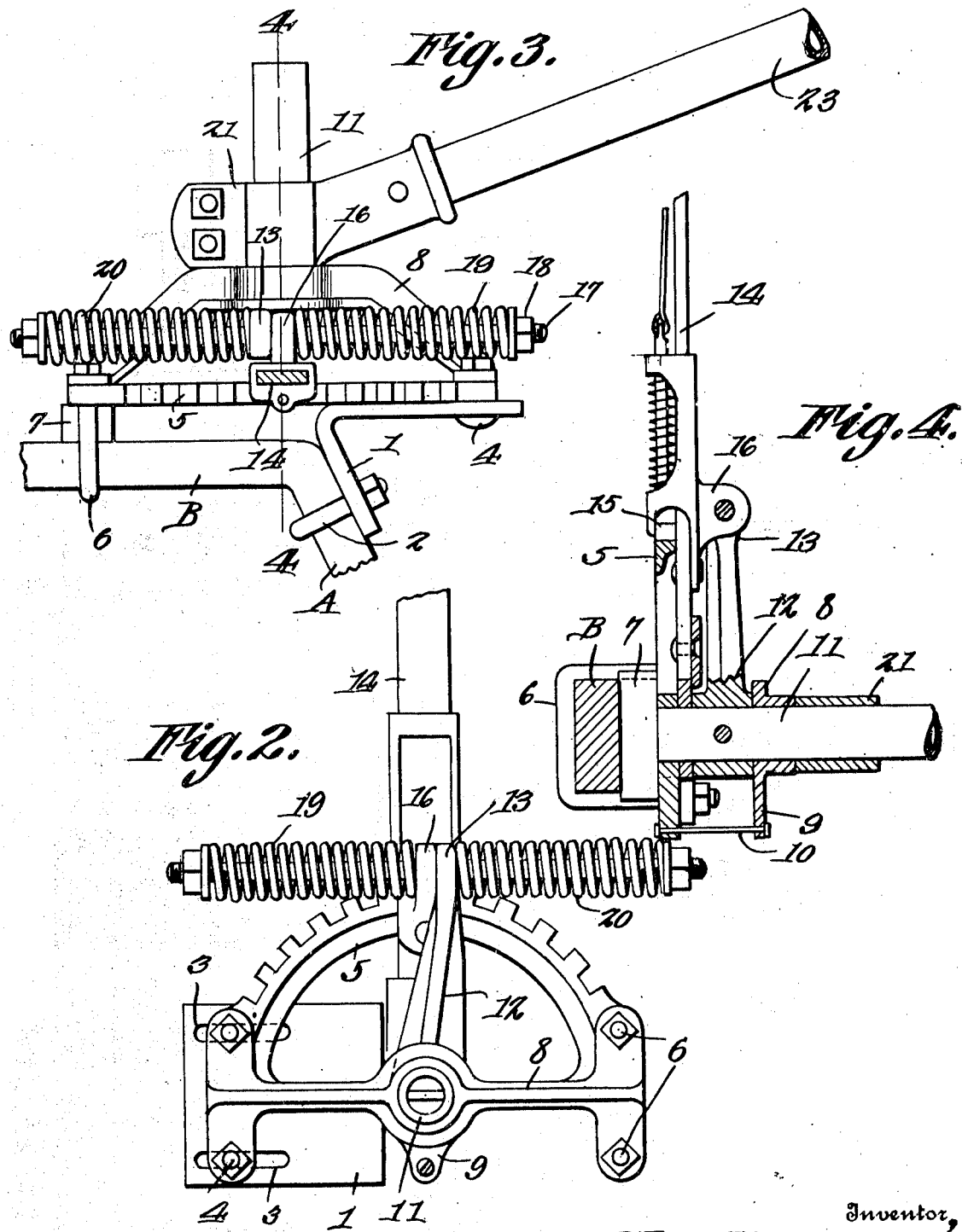

WILLARD O. LONG, OF MANSFIELD, OHIO.

HARROW ATTACHMENT FOR PLOWS.

1,314,678. Specification of Letters Patent. Patented Sept. 2, 1919.

Application filed July 8, 1918. Serial No. 243,848.

*To all whom it may concern:*

Be it known that I, WILLARD O. LONG, a citizen of the United States, residing at Mansfield, in the county of Richland and State of Ohio, have invented a new and useful Harrow Attachment for Plows, of which the following is a specification.

This invention relates to an attachment for plows, said attachment being in the form of a harrow having means for holding it diagonally beyond one side of the plow where it will engage the soil immediately subsequent to the loosening thereof by the plow, so as thus to smooth and pulverize it, thereby preparing a seed bed without the necessity of trampling over any part of the prepared soil.

Another object is to provide a hand lever having means whereby the harrow controlled thereby can be pressed yieldingly against the soil, it being possible to lock said lever against movement without, however, preventing movement of the harrow controlled by the lever.

With the foregoing and other objects in view which will appear as the description proceeds, the invention consists of certain novel details of construction and combinations of parts which will be hereinafter more fully described and pointed out in the claims, it being understood that various changes may be made in the construction and arrangement of the parts without departing from the spirit or sacrificing any of the advantages of the invention as set forth in the appended claims.

In the accompanying drawings the preferred form of the invention has been shown.

In said drawings—

Figure 1 is a perspective view of the attachment applied to a two bottom gang plow.

Fig. 2 is a side elevation of the harrow controlling mechanism, a portion of the lever being removed.

Fig. 3 is a plan view of said mechanism, the lever being shown in section.

Fig. 4 is a section on line 4—4, Fig. 3, the lever being shown in section.

Referring to the figures by characters of reference, A designates the diagonal rear portion of the frame of a two bottom plow, and B designates the longitudinal portion of said frame. A V-shaped bracket 1 is attached to the diagonal portion A by means of a U-bolt 2 engaging one end portion of the bracket. Slots 3 are formed in the other end portion of the bracket and receive bolts 4 which are adjustable therein and serve to connect one end of a toothed segment 5 to the bracket. The other end of the segment is connected to the portion B of the frame by a U-bolt 6, there being a spacing block 7 interposed between the segment and the beam, as shown. The bolts 4 and 6 engage the ends of a yoke 8 which spans one face of the segment and is provided with a central depending ear 9 tied to the bottom portion of the segment by a bolt 10.

A short shaft 11 is journaled in the lower portion of the segment 5 and in the yoke 8 and secured to this shaft between the yoke and segment is the lower end of an arm 12, there being an eye 13 at the upper end of the arm. A hand lever 14 is fulcrumed on the shaft 11 between the arm 12 and the segment 5 and carries a spring controlled dog 15 for engaging the segment to hold the lever against movement. A lug 16 extends laterally from the lever and back of the eye 13 and extending loosely through this lug and through the eye is a rod 17 having a bur on each end, as shown at 18. A coiled spring 19 is interposed between one of these burs and the lug 16 while another similar spring 20 is interposed between the other bur and the eye 13.

A split sleeve 21 is adjustably and detachably connected to the shaft 11 and has a tubular extension or socket member 22 extending obliquely therefrom. Secured in this socket member is one end of an arm 23 the other end of which arm is attached to a harrow structure shown generally at 25 and which forms the subject matter of a divisional application.

From the foregoing it will be understood that when the lever 14 is swung forward by the operator, the lug 16 will press against the eye 13 and cause arm 12 to swing and rotate the shaft 11. Thus the arm 23 will be elevated and the harrow lifted bodily from the ground. When the lever 14 is moved in the opposite direction the harrow will be brought into engagement with the ground and by continuing the movement of the lever the lug 16 will thrust against its spring 19 which in turn will thrust against the bur 18 in the path thereof and cause the rod 17 to pull through the other bur, upon the other spring 20 and compress it against the eye 13. Thus the harrow will be pressed yieldingly into the soil, both springs acting simultaneously and affording a considerable range of movement.

What is claimed is:—

1. The combination with a support, of a toothed segment detachably secured thereto, a revoluble shaft extending laterally from the segment, an arm revoluble with the shaft, a controlling lever, means thereon for engaging the segment, a lug extending from the lever, a rod slidably mounted within the lug and said arm, springs upon the rod and spaced apart by the lug and arm, and means upon the ends of the rod for engaging the springs.

2. The combination with a support, of a toothed segment detachably secured thereto, a revoluble shaft extending laterally from the segment, an arm movable with the shaft and having an eye, a controlling lever fulcrumed on the shaft, means thereon for engaging the segment, a lug on the lever for bearing against one face of the eye when the lever is moved in one direction, a rod extending loosely through the eye and lug, springs upon the rod and spaced apart by the lug and eye, and means upon the ends of the rod for engaging the respective springs.

3. The combination with a toothed segment, of a revoluble shaft, a lever loosely mounted on the shaft and adapted to move independently thereof, means carried by the lever for engaging the segment to lock the lever, a rod carried by and adapted to slide longitudinally relative to the lever, an arm revoluble with the shaft and slidably engaged by the rod, said arm, lever and rod being adapted to swing about the same axis, springs upon the rod and spaced apart by the arm and lever, and means at the ends of the rod for engaging the springs, said rod constituting means for placing both springs under compression during the movement of the lever in one direction relative to the arm or during the movement of the arm in the opposite direction relative to the lever.

4. The combination with a controlling lever, means for securing the lever, a shaft revoluble relative to the lever, and an arm movable with the shaft, of coöperating means upon the lever and arm for rotating the shaft when the lever is moved in one direction, a rod slidable relative to and supported by the lever and arm, springs on the rod and spaced apart by the lever and arm, and means on the ends of the rod for engaging the springs.

In testimony that I claim the foregoing as my own, I have hereto affixed my signature in the presence of two witnesses.

WILLARD O. LONG.

Witnesses:
   IVY E. SIMPSON,
   Mrs. W. O. LONG.